Aug. 14, 1928.
J. N. EDELIN
1,680,774
ICE PICK
Filed April 14, 1926
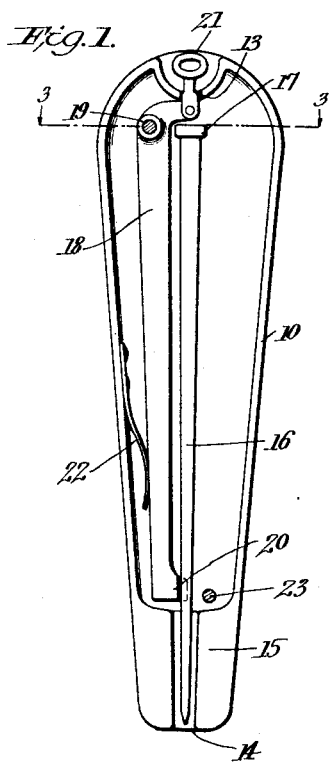
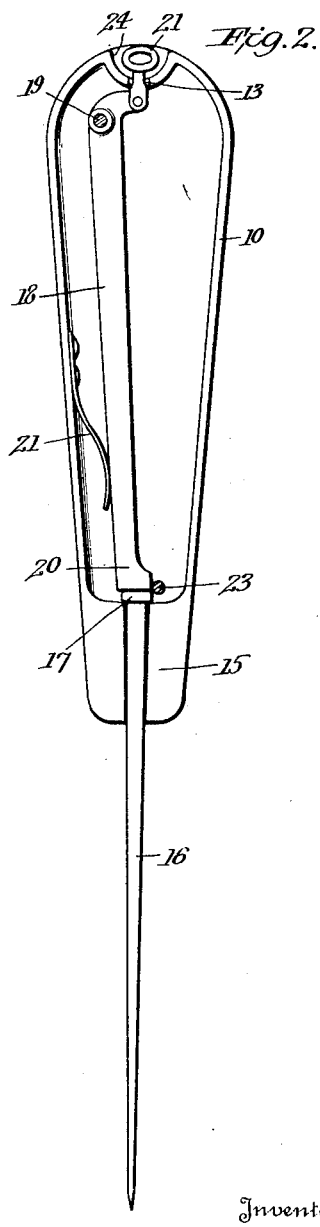
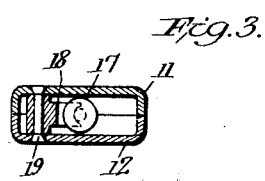
Inventor
James N. Edelin
By Emery, Booth, Janney & Varney
his Attorneys

Patented Aug. 14, 1928.

UNITED STATES PATENT OFFICE.

JAMES NOBLE EDELIN, OF WASHINGTON, DISTRICT OF COLUMBIA.

ICE PICK.

Application filed April 14, 1926. Serial No. 102,029.

The present invention relates to ice picks or similar household implements and aims generally to improve such implements and adapt them for convenient use.

In the drawings, I have selected for illustrative purposes one embodiment of my invention wherein, Fig. 1 is a similar view of the pick in its closed and inoperative position.

Fig. 2 is a vertical sectional view of my ice pick open ready for use.

Fig. 3 is a horizontal sectional view taken on the line 3—3 of Fig. 1.

In the illustrative embodiment of my invention shown in the drawings, the implement comprises a hollow handle member 10 formed of any suitable material such as wood, steel, aluminum or hardened plastic composition, as may be desired Preferably the handle member is made of sheet steel and is formed of two similar sections 11 and 12 stamped, or otherwise shaped to be conveniently grasped in the hand of the user. The sections 11 and 12 when placed together constitute a handle member completely enclosed except for an aperture 13 at the upper end and an aperture 14 at the lower end. The handle sections 11 and 12 are formed, at their lower end, with portions 15 which coact to form an elongated guideway for a pick member 16 to slide through and also to form an abutment for limiting the movement of the pick member toward projected position.

The pick member 16 is slidably mounted within the handle portion, and is preferably tapered, as shown, and has formed, on its upper end, an enlarged head portion 17. The handle member 10 and pick member 16 are preferably so shaped and proportioned that the pick will slide through the guide opening 14 at the lower end of the handle into projected operative position when the implement is held in upright position as shown in Fig. 2, and will slide into retracted inoperative position when held in inverted position.

Suitable means are provided for holding the pick member in retracted position and also for constituting an abutment for the end thereof when in projected position, ready for use. As shown, a lever or other member 18 is fulcrumed upon a pin 19, within the handle member, and is formed with an enlargement 20 adapted to engage frictionally the pick member and hold it in retracted position, and also to constitute an enlarged head against which the head 17 of the pick may abut when in its projected position, ready for use. The lever member is provided with an operating member 21 preferably formed as an eye, the stem of which extends through the opening 13 in the upper end of the handle member and is pivotally secured to the upper end of the lever 18. A spring 22, secured to the inner side wall of the handle member provides means for resiliently urging the lower end of the lever 18 into contact with the pick member when it is in retracted position and also to move it to a position directly over the pick member when the latter is in its projected position. The enlargement 20 of the lever 18, being positioned directly over the center of the head of the pick member, affords a substantially rigid and secure abutment to the inward thrust thereof when the implement is in use.

The fulcrum pin 19 is preferably in the form of a rivet or other suitable device, serving the combined functions of pivotally supporting the lever and also securing the sections 11 and 12 of the handle member together. If desired, of course, additional means may be provided for securing the lower portions of the handle sections together as at 23.

The handle members 11 and 12 may be depressed as at 24 in the region of the aperture 13 to house the member 20, permitting the implement to be grasped by the user with the palm of the hand over the end of the handle member, without liability of releasing the pick member when the implement is in use. The eye shaped member 21, serves not only as an operating member for the lever 15, but also as a means by which the implement may be hung upon a nail or hook when not in use.

Advantages of my invention are its simplicity, and durability as well as the ease with which the pick may be housed within the handle or projected therefrom ready for use. Furthermore, the construction provides an improved ice pick for use by housewives, ice dealers and others, which when the pick member is in its retracted position, will be safe to carry on one's person. The arrangement wherein the operating member 21 extends through the upper end of the handle, permits the user to securely grip the handle portion of the implement without danger of releasing the pick member when the implement is in use.

Obviously my invention is not to be restricted to the details of construction shown and described.

What I claim as my invention and desire to secure by Letters Patent is:

1. An ice pick comprising a hollow handle member closed along its sides and provided with openings in its opposite ends, a protractile pick member freely slidable within said handle member and adapted to be projected from the handle member ready for use or retracted within the handle when not in use, a pivotally mounted lever housed within said handle portion and having an operating portion extending through the upper end of the handle member, and spring means engaging said lever for yieldingly urging it against said pick member to hold it in retracted position.

2. An ice pick comprising a hollow handle member, a protractile pick member mounted within said handle member and capable of retractile movement within the handle to be wholly housed therein when not in use, a pivoted lever member housed within said lever and formed with an enlarged head adapted to overlie the center of the pick member when in projected position thereby to constitute a rigid abutment therefor, and means for moving said lever out of the path of said pick member whereby to permit it to slide into retracted position with said handle member.

3. An ice pick comprising a hollow handle member, a protractile pick member mounted within said handle member and capable of movement into the handle to be wholly housed therein when not in use, a pivoted lever member housed within said handle and formed with an enlarged head adapted to overlie the center of the pick member when in projected position thereby to constitute a rigid abutment therefor, means for moving said lever out of the path of said pick member whereby to permit it to slide into retracted position within said handle member, said means comprising an operating member connected to said lever and extending through the upper end of said handle member, whereby said handle member may be firmly grasped in the hand of the user when in use, without liability of accidentally releasing said pick member.

4. An ice pick comprising a hollow handle member, a protractile pick member mounted within said handle member and capable of movement into the handle to be wholly housed therein when not in use, a pivoted lever member housed within said handle member and formed with an enlarged head adapted to overlie the center of the pick member when in projected position thereby to constitute a rigid abutment therefor, means for moving said lever out of the path of said pick member whereby to permit it to slide into retracted position within said handle member, said means comprising an operating member connected to said lever and extending through the upper end of said handle member, and formed as an eye whereby to afford means for hanging the device upon a hook or the like when not in use.

5. An ice pick comprising a hollow handle member, a protractile pick member mounted within said handle member and adapted to be moved into a working position extending beyond the handle or to a retracted position within the handle, means for locking said pick member in either of its positions, said means adapted to constitute an abutment for said pick member when in working position in the line of thrust thereof.

6. An ice pick comprising a handle member formed of opposed sections, a protractile pick member movably mounted within said handle member, and adapted to assume a working position ready for use or a retracted position when not in use, a lever for holding the pick member in either working or retracted position, and a pivot pin for said lever serving also as a means for fastening said handle sections together.

7. An ice pick comprising a handle member formed of opposed metallic sections, a pick member slidable within said handle member, said sections being enlarged at their upper ends and tapering to a reduced neck portion at their lower ends thereby to form a guide for said pick member and a means for restricting its outward movement to working position, a lever member housed wholly within said handle member and pivoted to the upper portion thereof, the lower end of said lever adapted to be positioned centrally over the head of said pick member thereby to constitute a rigid abutment between said handle and pick member, in the direction of the axis thereof.

8. An ice pick comprising a handle member formed of opposed metallic sections, a pick member slidable within said handle member, said sections being enlarged at their upper ends and tapering to a reduced neck portion at their lower ends thereby to form a guide for said pick member of considerably less diameter than the width of the handle member, and a means for restricting its outward movement to working position, a lever member housed wholly within said handle member and pivoted to the upper portion thereof, the lower end of said lever adapted to be positioned centrally over the head of said pick member thereby to constitute a rigid abutment between said handle and pick member, in the direction of the axis thereof thereby to securely lock said pick member between said lever and said guide.

9. An ice pick comprising a handle member formed of opposed sections 11—12, a projectible pick member 16 within the handle member, and capable of being housed wholly within the handle member when not in use, or projected therefrom ready for use. a manually controllable lever 18 mounted within said handle member adapted to hold said pick member in either of its positions, said handle members being formed with portions 15 constituting a guide and an abutment for limiting the movement of said pick member into projected position.

In testimony whereof, I have signed my name to this specification.

JAMES NOBLE EDELIN.